(12) United States Patent
Leung

(10) Patent No.: US 6,793,355 B1
(45) Date of Patent: Sep. 21, 2004

(54) MIRROR BALL

(75) Inventor: Wing Leung, Siu Sai Wan (CN)

(73) Assignee: Green Logic Associates Limited, Tortola (VG)

( * ) Notice: Subject to any disclaimer, the term of this patent is extended or adjusted under 35 U.S.C. 154(b) by 85 days.

(21) Appl. No.: 10/336,602

(22) Filed: Jan. 3, 2003

(51) Int. Cl.[7] .............................. G02B 5/08; G02B 7/182
(52) U.S. Cl. ................... 359/850; 359/851; 359/872; 359/876; 359/877
(58) Field of Search .............................. 359/850, 851, 359/855, 867, 872, 876, 877

(56) References Cited

U.S. PATENT DOCUMENTS

| | | | |
|---|---|---|---|
| 1,214,863 A | * | 2/1917 | Woeste |
| 1,541,687 A | * | 6/1925 | Cory |
| 1,655,468 A | * | 1/1928 | Lewis |
| 1,658,455 A | * | 2/1928 | Metzech et al. |
| 1,747,556 A | * | 2/1930 | Price |
| 4,250,537 A | * | 2/1981 | Roegner et al. |
| 4,491,125 A | * | 1/1985 | Sainsbury |
| 5,035,623 A | * | 7/1991 | Coudurser et al. |
| 5,079,645 A | * | 1/1992 | Ritter |
| 5,324,224 A | * | 6/1994 | Anderson et al. |

FOREIGN PATENT DOCUMENTS

| | | | |
|---|---|---|---|
| FR | 2681528 | * | 3/1993 |
| GB | 2350418 | * | 11/2000 |

* cited by examiner

Primary Examiner—Ricky D. Shafer
(74) Attorney, Agent, or Firm—Alix, Yale & Ristas, LLP

(57) ABSTRACT

A mirror ball comprises a pair of counter-rotating reflective hemispheres. These are each attached to rotating bevel gears that are in mesh with a horizontal static bevel gear. A vertical spindle rotates with respect to a shaft extending upwardly from a base that supports the mirror ball. The spindle has a spindle gear that is driven to rotate with respect to the shaft by an electric motor and reduction gearbox.

8 Claims, 3 Drawing Sheets

MIRROR BALL

BACKGROUND OF THE INVENTION

The present invention relates to mirror balls. More particularly, although not exclusively, the invention relates to an internally motorised mirror ball having a pair of counter-rotating reflective hemispheres separated by a rotating equator.

Known mirror balls are suspended from an overhead structure such as the ceiling joist and rotate due to air moving around the room. Other known mirror balls are mounted upon a vertical motor-driven shaft.

The above mirror balls reflect standard patterns of light providing spots that moves about the walls in a known and expected manner.

OBJECT OF THE INVENTION

It is an object of the present invention to provide an internally motorised mirror ball having counter-moving reflective surfaces to provide a more interesting lighting effect.

DISCLOSURE OF THE INVENTION

There is disclosed herein a mirror ball comprising:
a shaft having a static drive transmission member attached thereto or formed integrally therewith,
a motor attached directly or indirectly to the shaft,
a spindle co-linear with the shaft and having a radially extending arm having a rotating drive transmission member attached thereto and engaging with the static drive transmission member,
a drive train transmitting output of the motor to cause rotation of the spindle with respect to the shaft to thereby cause rotation of the spindle and moving interaction between the rotating drive transmission member and the static drive transmission member, and
a shell fixed to the rotating drive transmission member and having reflective surfaces thereon.

Preferably the static drive transmission member is a bevel gear and the rotating drive transmission member is a bevel gear in mesh with the static drive transmission member.

Preferably a further arm extends radially from the spindle in a direction opposite to that of the radially extending arm and has a counter-rotating drive transmission member attached thereto and engaging with the static drive transmission member, and the mirror ball further comprises another shell having reflective surfaces thereon and fixed to the counter-rotating drive transmission member.

Preferably the shells are substantially hemispherical and in combination substantially spherical.

Preferably there is an equatorial ring attached to the spindle in between the shells.

Preferably the equatorial ring has reflective surfaces thereon.

Preferably the drive train comprises a spindle gear attached to or formed integrally with the spindle and a reduction gearbox transmitting output of the motor to the spindle gear.

Preferably the shaft extends from a base and supports the mirror ball.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
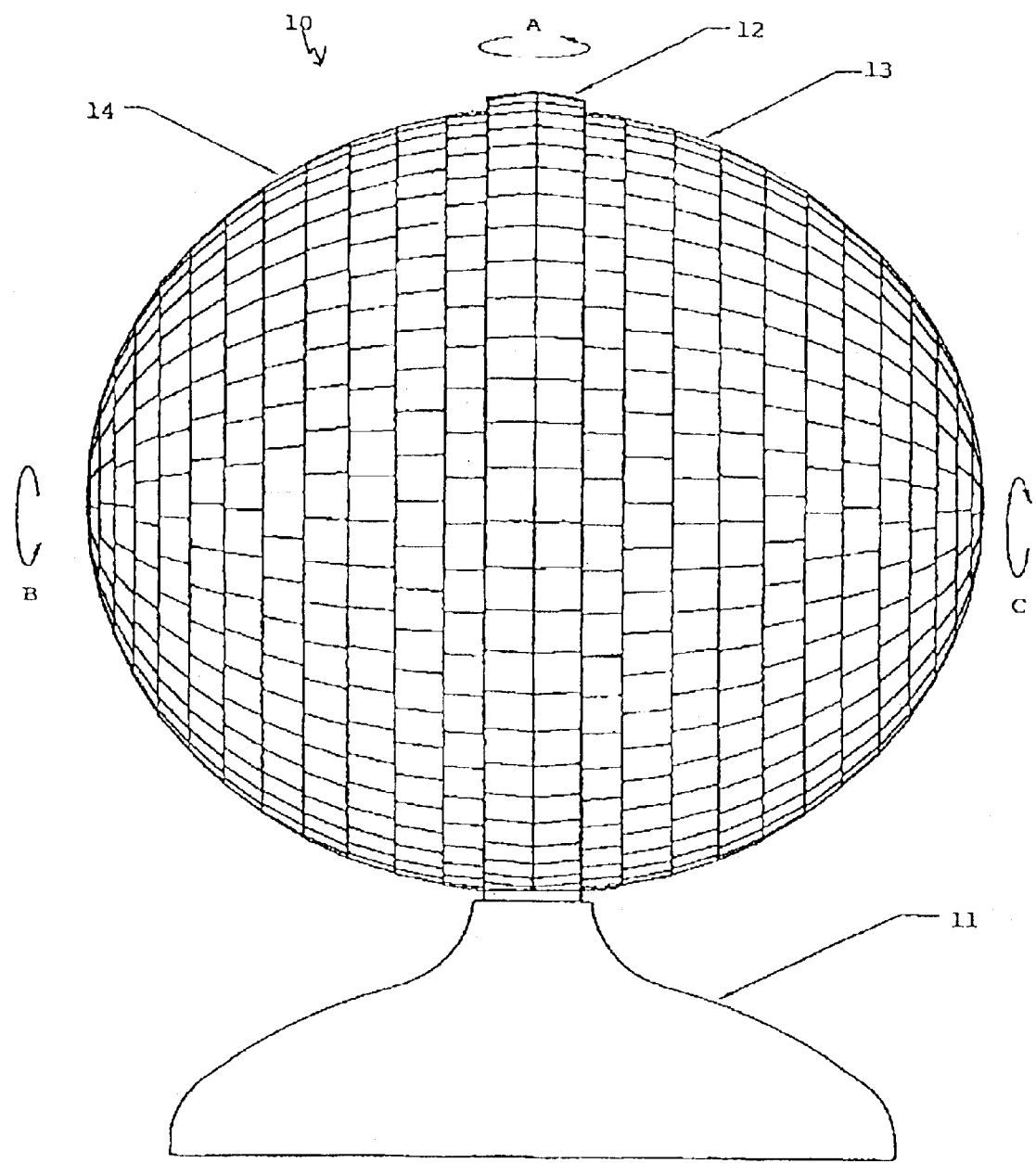
FIG. 1 is a schematic perspective illustration of a mirror ball.
Figure 2:
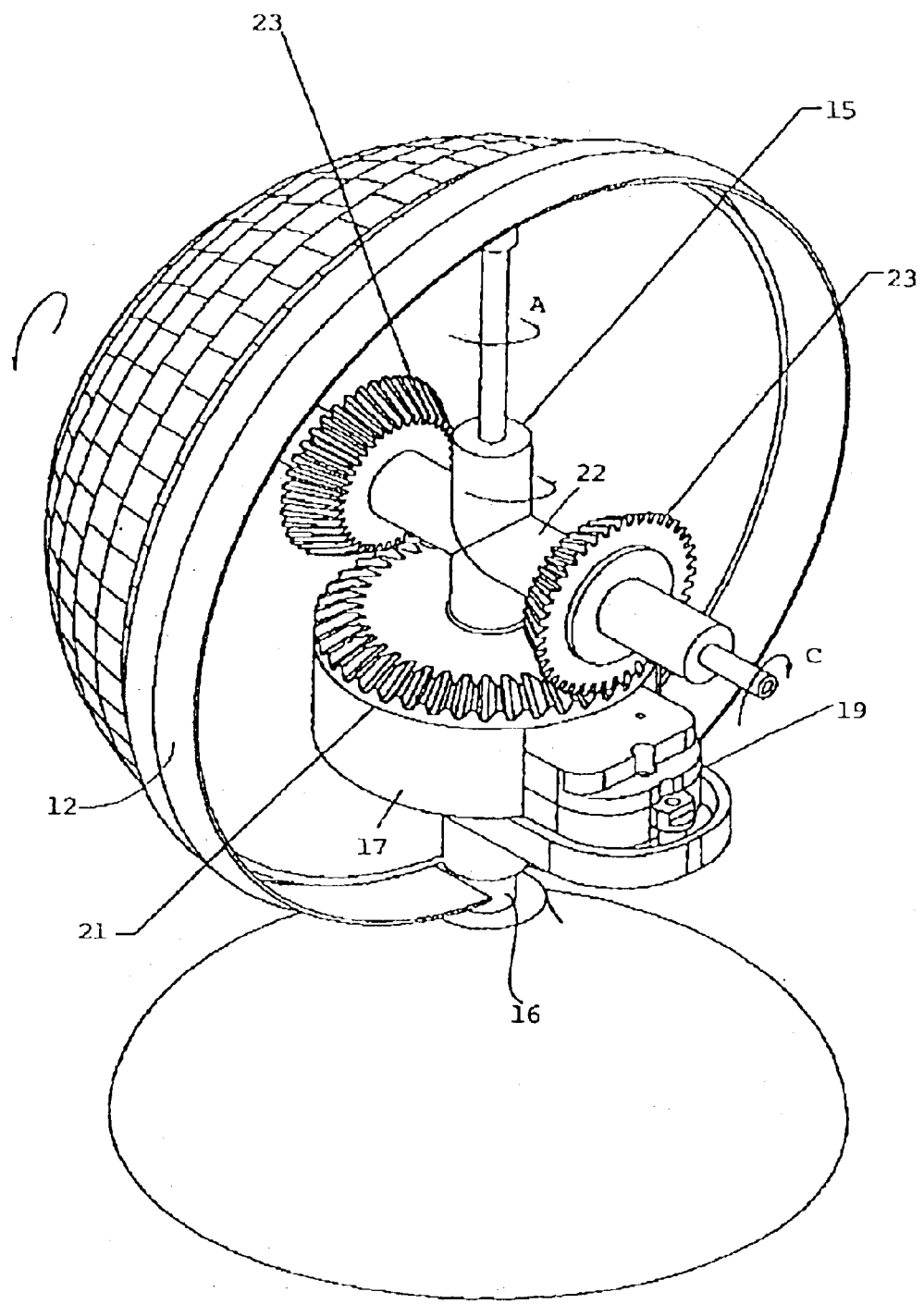
FIG. 2 is a schematic perspective illustration of the mirror ball of FIG. 1 with one of its hemispherical shells removed.
Figure 3:
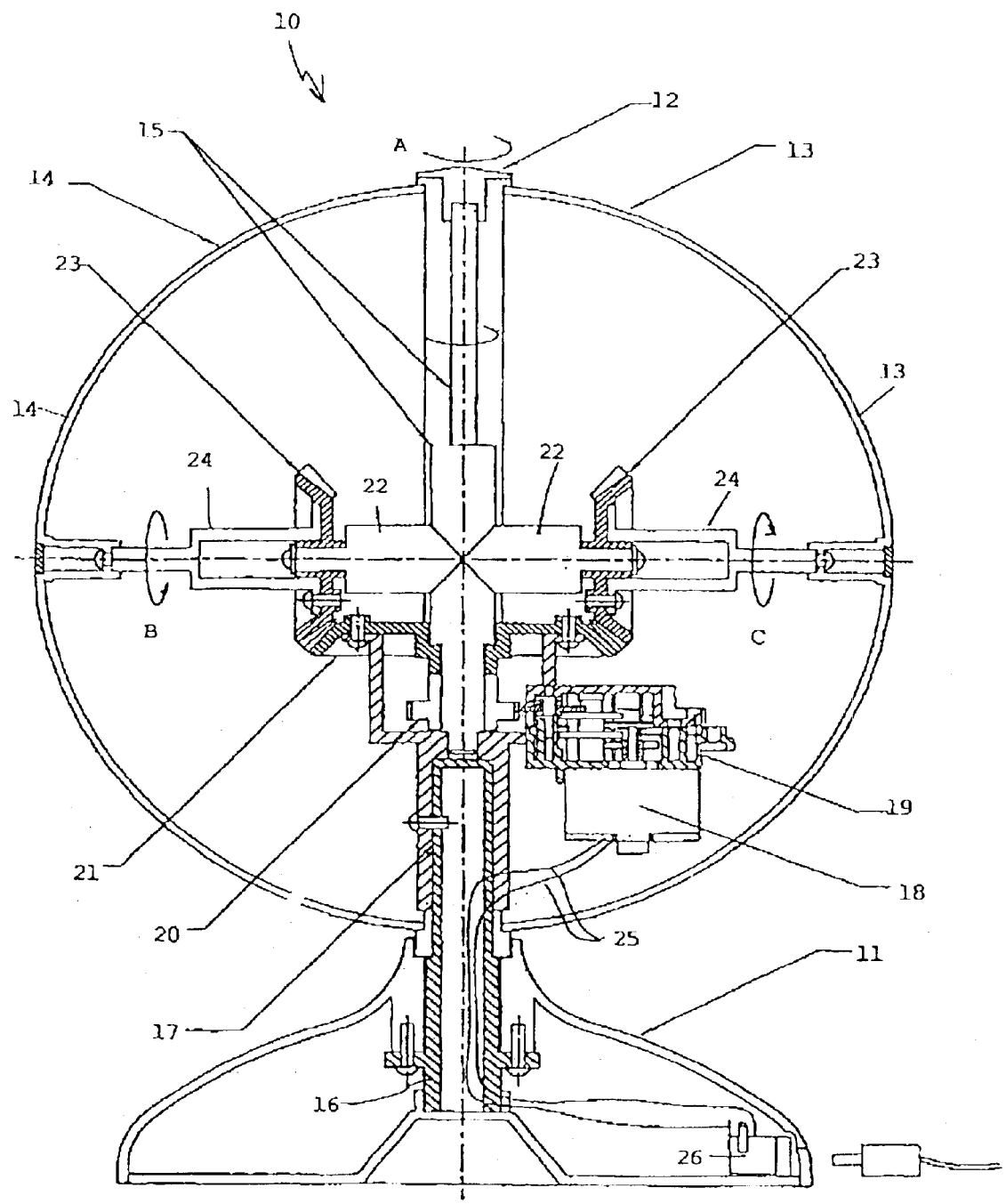
FIG. 3 is a schematic cross-sectional elevational view of the mirror ball of FIGS. 1 and 2.

In-the accompanying drawings there is depicted schematically a mirror ball 10. The mirror ball comprises a base 11 supporting a ring 12 that separates a pair of hemispherical shells 13 and 14. The ring 12 and the shells 13 and 14 each have flat reflective mirrors adhered to their outer-facing surfaces.

Extending upwardly from the base 11 is a shaft 16 to which there is attached a supporter 17. A motor 18 is attached via a gearbox housing 19 to the supporter 17. Within the gearbox housing 19 there is a reduction gear system, the last gear of,which meshes with a spindle gear 20. Spindle gear 20 is fixed the to or formed integrally with a spindle 15 that is co-linear with the shaft 16 and supports the ring 12 and its upper end.

The supporter 17 also supports a static bevel gear 21 having upwardly facing teeth.

Two diametrically opposed radial arms 22 are formed integrally with the spindle 15 and each rotatably support a rotating bevel gear 23. Each rotating bevel gear 23 is in mesh with the static bevel gear 21. An extension 24 is attached to each rotating bevel gear 23 and a respective one of the hemispherical shells 13, 14 is attached to each extension. Upon rotation of the spindle 15 as indicated by arrow A, the rotating bevel gears ride about the static bevel gear 21 to effect counter-rotation of the respective shells 13, 14.

There are electrical cables 25 passing from the motor 18 through the shaft 16 connected to an electrical socket 26 in the base 11.

Upon the provision of electric current to the motor 18, its output is transmitted by the gear train within the gearbox housing 19 to the spindle gear 20. As a result, the spindle 15 and the ring 12 rotate about a vertical axis as indicated by arrow A. The described interaction between the rotating bevel gears 23 and the static bevel gear 21 results in counter rotation of the hemispherical shells 13, 14 as indicated by arrows B and C.

Upon activation of the mirror ball, light from a remote light source or multiple sources incident upon the reflective surfaces will-be reflected in an interesting and variable manner.

It should be appreciated that modifications and alterations obvious to those skilled in the art are not to be considered as beyond the scope of the present invention. For example, instead of intermeshing gears, there might be fictional contact between counter-rotating wheels and a substantially horizontal disc. Furthermore, the mirror ball could be inverted and attached to a ceiling for example. In this case, the base could be reconfigured somewhat like a light fitting rose.

What is claimed is:
1. A mirror ball comprising:
a shaft having a static drive transmission member attached thereto or formed integrally therewith,
a motor attached directly or indirectly to the shaft,
a spindle co-linear with the shaft and having a radially extending arm having a rotating drive transmission member attached thereto and engaging with the static drive transmission member, a drive train transmitting output of the motor to cause rotation of the spindle with respect to the shaft to thereby cause rotation of the spindle and moving interaction between the rotating drive transmission member and the static drive transmission member, and a shell fixed to the rotating drive transmission member and having reflective surfaces thereon.

2. The mirror ball of claim 1 wherein the static drive transmission member is a bevel gear and the rotating drive transmission member is a bevel gear in mesh with the static drive transmission member.

3. The mirror ball of claim 1 comprising a further arm extending radially from the spindle in a direction opposite to that of the radially extending arm and having a counter-rotating drive transmission member attached thereto and engaging with,the static drive transmission member, and further comprising another shell having reflective surfaces thereon and fixed to the counter-rotating drive transmission member.

4. The mirror ball of claim 3 wherein the shells are substantially hemispherical and in combination substantially spherical.

5. The mirror ball of claim 4 wherein there is an equatorial ring attached to the spindle in between the shells.

6. The mirror ball of claim 5 wherein the equatorial ring has reflective surfaces thereon.

7. The mirror ball of claim 1 wherein the drive train comprises a spindle gear attached to or formed integrally with the spindle and a reduction gearbox transmitting output of the motor to the spindle gear.

8. The mirror ball of claim 1 wherein the shaft extends from a base and supports the mirror ball.

* * * * *